3,660,364
ELASTIC FILMS, FIBERS AND OTHER MANUFACTURED ARTICLES BASED ON UNSATURATED OLEFINIC COPOLYMERS
Paolo Longi, Alberto Valvassori, and Francesco Greco, Milan, and Ermanno Bernasconi, Caronno Varesino, Varese, Italy, assignors to Montecatini Edison S.p.A., Milan, Italy
Filed Apr. 2, 1969, Ser. No. 812,663
Int. Cl. C08f 15/40, 5/00
U.S. Cl. 260—80.78                                   8 Claims

ABSTRACT OF THE DISCLOSURE

These are disclosed elastic manufactured articles, including elastic fibers and films based on unsaturated, vulcanizable copolymers of ethylene, at least one branched alpha-olefin, hydrocarbon monomers containing at least two double bonds and, optionally, propylene, which copolymers are amorphous in the relaxed state but crystallizable by stretching. The copolymers must contain, by moles, 70–90% of polymerized ethylene, 1–29% of polymerized branched alpha-olefin, 0.05–3% of the polymerized hydrocarbon monomer containing at least two double bonds, and 0–28% of polymerized propylene. Methods for obtaining the copolymers using catalysts based on vanadium compounds and metalorganic aluminum compounds, and for effectively cross-linking the copolymers are also disclosed.

---

The object of this invention is to provide manufactured articles, particularly elastic fibers and films based on new, unsaturated, high molecular weight, vulcanizable copolymers of ethylene, at least one branched alpha-olefin, at least one hydrocarbon monomer containing at least two double bonds and, optionally, propylene as referred to in the foregoing "Abstract of the Disclosure," which articles have especially valuable characteristics and many important practical applications.

As indicated hereinabove, these new copolymers containing, by moles, 70–90% of polymerized ethylene, 1–29% of branched alpha-olefins, 0.05–3% of hydrocarbon monomer containing at least two double bonds, and 0–28% of propylene, although being amorphous in the relaxed state, are capable of crystallizing under stretching, both before and after vulcanization but especially after being vulcanized.

When articles formed of these copolymers or the vulcanizates thereof are stretched, and more especially when they are subjected to stretching such that a high elongation value is attained (e.g., when the articles are stretched to at least 100% of their initial length), the copolymers, or the vulcanizates thereof and more especially the latter, have very high tensile strengths which are only realized after the articles have been stretched, in contrast to the dynamic properties, similar to those of an elastomer, which the copolymers and vulcanizates possess when in the relaxed state or if articles comprising them are subjected to a stretch resulting in an elongation of less than 100% of the original length of the articles.

Articles comprising our new copolymers, particularly after the copolymers are vulcanized prior to or simultaneously with formation of the article, have elongations at break of from 300 to 3000%, tensile strengths of from 30 to 600 kg./sq. cm., and elastic recoveries of from 85 to 100%.

Our new copolymers are obtained by copolymerizing a mixture of the monomers, in relative proportions to result in the copolymerizates containing the respective polymerized monomers in the molar percentages stipulated, in contact with catalysts prepared from (a) a hydrocarbon-soluble vanadium compound, for instance vanadium tetrachloride, vanadium oxychloride, vanadium triacetyl-acetonate, alkoxy-vanadium chloride, vanadium alcoholates, and vanadium or vanadyl salts of carboxylic acids; and (b) an organometallic aluminum compound, particularly alkyl aluminum compounds such as, for instance, triethyl aluminum, triisobutyl aluminum, trihexyl aluminum, diethyl aluminum chloride, diethyl aluminum bromide, ethyl aluminum sesquichloride, ethyl aluminum dichloride, diethyl aluminum monoalcoholate, alkoxyethyl aluminum chloride.

In practice, in order to obtain best results, it is necessary to use catalytic systems containing halogen, i.e., catalysts in which halogen is contained in at least one of the catalyst forming components (a) and (b).

The polymerization is carried out in absence of air and moisture, in general using hydrocarbons as the polymerization medium, which may be, for instance, n-heptane, cyclohexane, benzene, toluene or liquid propylene, and by operating at temperatures comprised between $-100°$ and $+100°$ C., but preferably between $-40°$ C. and $+30°$ C.

Ethylene and propylene (when the latter is used as comonomer) may be used mixed with each other in the desired ratio in the form of a gas, or may be used separately (ethylene in the gaseous state, and propylene in the liquid state); the branched alpha-olefin and the unsaturated hydrocarbon containing at least two double bonds are more conveniently used in solution in a hydrocarbon solvent.

The branched alpha-olefin may be, for instance, 4-methylpentene-1, 3-methylbutene-1, 3-methylpentene-1, 5-methylhexene-1, 5,5 - dimethylhexene-1, 3,7-dimethyloctene-1, etc.

When the catalytic system is prepared from diethyl-aluminum chloride and vanadium triacetylacetonate, for example, copolymers containing propylene and ethylene in the relative amounts stipulated, can be obtained by feeding the two gaseous monomers at a temperature of $-30°$ C. in molar ratios propylene/ethylene comprised between 0 and 2.5; the molar ratio of ethylene to 4-methylpentene-1 in the liquid phase must be comprised between 4 and 1.5.

The hydrocarbon monomer containing at least two double bonds which is used as one comonomer may be linear or cyclic. One of the double bonds participates in the copolymerization reaction, in contact with the catalysts aforesaid, while the other (or others) provide sites for the formation of cross-links when the copolymer is subjected to one or more of the cross-linking treatments described below.

Typical examples of the usable hydrocarbon comonomers are:

(a) non-conjugated aliphatic dienes or polyenes such as, for instance, hexadiene-1,4; 5,7-dimethyloctadiene-1,6; decatriene-1,4,9, (b) alkenylcycloalkenes, e.g., 4-vinylcyclohexene-1; 3-(2-butenyl) cyclobutene,
(c) non-conjugated monocyclic dienes such as, for instance, cyclooctadiene-1,5; cycloheptadiene-1,4,
(d) endomethylenic polycyclic polyenes such as, for instance, dicyclopentadiene; 5-butenyl-norbornene-2; 5-isopropenyl norbornene-2; 5-ethylidene norbornene-2,
(e) polycyclic polyenes having condensed rings in which each pair of condensed rings has two carbon atoms in common such as, for instance, 4,9,7,8-tetrahydroindene; 6-methyl-4,9,7,8-tetrahydroindene; 5,6-dimethyl-4,9,7,8-tetrahydroindene,
(f) di- or poly-alkenylcycloalkanes such as divinylcyclobutane; trivinyl cyclohexane.

The terpolymers obtained have a molecular weight higher than 20,000, as is proved by the fact that they possess an intrinsic viscosity, measured in Tetralin at 135° C., greater than 0.5.

In order to obtain products having a particular average degree of polymerization, it may be desirable to conduct the copolymerization in the presence of suitable molecular weight regulating agents. Examples of such agents include hydrogen, diethyl zinc, diethyl cadmium and, in general, organometallic compounds of zinc and cadmium, halogenated hydrocarbons, olefins with cumulated double bonds such allene, or acetylenic hydrocarbons.

At the end of the polymerization, in general, in order to purify and isolate the obtained terpolymer, the reaction product is treated with methanol containing 5% of concentrated HCl, the methanolic phase (which has extracted all the catalyst decomposition products) is separated, the residual heptanoic phase is washed repeatedly with methanol and, finally, the polymer is precipitated by adding acetone, washed with acetone, and dried at 80° C. under reduced pressure. In these operations, the methanol may be replaced by water and the precipitation with acetone may be omitted and the polymerization solvent stripped off.

The terpolymers prepared by the method described are essentially free of cross-links, regardless of the ethylene/propylene molar ratio (if propylene is used and within the limits disclosed) and are completely soluble in boiling heptane, xylene, and Tetralin.

However, the copolymers can be easily converted into cross-linked products by the following cross-linking processes:

(1) vulcanization with sulphur, according to any of the known techniques and by operating either in the presence or absence of fillers;
(2) cross-linking with sulfur chlorides, used either in the gaseous state or in solution in a solvent which may be an aliphatic, aromatic or halogenated hydrocarbon, an ether, etc. at a temperature of from 0° C. to 200° C., preferably from 0° C. to 100° C., and by operating under partial pressures of the above cited reactants comprised between 0.1 and 10 atm. (or at concentrations comprised between 0.1 and 100%, preferably between 1 and 50%). The duration of their cross-linking treatment in general is comprised between 1 and 600 minutes. This cross-linking, when appropriate, may be carried out in the presence of sulfur and of fillers such as, for example, zinc oxide, silica, kaolin, etc.;
(3) cross-linking carried out by means of initiators (starting agents) of the radical type, such as for instance, azo-bis-isobutyronitrile, di-benzoylperoxide, etc., in the presence of coadjuvants, such as sulfur, and of fillers which may be preformed unsaturated polymers (for instance, styrene/vinylcyclohexene copolymer, styrene/butadiene copolymer, etc.); such a cross-linking is preferably carried out at temperatures comprised between 50° C. and 150° C.
(4) cross-linking by means of a combination of two or more of the above specified methods.

The cross-linking treatment modifies some of the physical and mechanical characteristics of the terpolymers, for instance the tensile strength and the elongation at break, as well as the elastic recovery.

The transformation of the copolymers into manufactured articles may be carried out either before or during the cross-linking, using shaping techniques which are known, per se. For instance, fibers can be manufactured from a shapeable mass comprising the molten copolymer or a solution thereof by spinning the mass or solution through a spinneret into a suitable setting medium. Films can be manufactured by casting the shapeable mass onto a suitable surface.

The presence of methyl groups of a particular type (such as in the isopropyl group of 4-methylpentene-1) in the copolymers does not hinder the parallelization of the macromolecular chains in fibers or other manufactured articles prepared from these copolymers which have been subjected to sufficiently high elongations. It is thus possible to form a polyethylenic crystal lattice and, consequently, to attain high values of both the elongation at break and the tensile strength. However, the presence of those particular methyl groups can cause considerable distortions inside the crystalline lattice formed and thereby reduce the melting temperature of the stretched articles. The copolymers which contain polymerized units of alpha-olefins such as propylene and butene-1 and do not contain polymerized units of branched alpha-olefins, do not present this possibility and the stretched articles comprising those copolymers have melting temperatures generally higher than 40° C.

The manufactured elastic articles of this invention have, in general, mechanical and elastic characteristics better than such articles obtained from copolymers the macromolecules of which do not contain polymerized units of branched alpha-olefins.

The peculiar properties of the terpolymers and tetrapolymers of the invention, which resemble the properties of both rubbers and conventional textile fibers, taken with the ease with which the terpolymers and tetrapolymers can be cross-linked, adopt the copolymers and cross-linked (vulcanized) products to use in the manufacture of elastic fibers, elastic films, plates, and, in general, articles which must combine high elasticity with high resistance to mechanical stress.

The following non-limiting examples are given to illustrate our invention.

EXAMPLE 1

The apparatus used consisted of a 4-necked 1000 cc. cylinder provided with a mechanical stirrer, a thermometer and pipes for the inlet and outlet of the gases. Into this apparatus were introduced, under a nitrogen atmosphere, 200 cc. of anhydrous-n-heptane, 0.78 g. of aluminum-diethyl chloride, 25 cc. of methyltetrahydroindene and 200 cc. of 4-methylpentene-1. This mixture was then cooled down to −20° C. and a gaseous ethylene current was introduced having a flow-rate of 45 l./hr. After about 15 minutes, 10 cc. of a toluene solution containing 0.1 gr. of vanadium acetylacetonate were added.

After 50 minutes the polymerization was stopped, the reaction product was treated in a separatory funnel with about half a liter of methanol containing 5% of HCl, and the heptane phase was separated from the methanol phase. The heptane phase was then washed repeatedly with further (non-acid) methanol and finally the dissolved polymer was precipitated by pouring the heptane phase into about 1 liter of a 1:1 by volume acetone/methanol mixture.

After drying at 80° C. under reduced pressure, 38 g. of a white polymer were obtained. It had intrinsic viscosity [$\eta$] 1.25 dl./g., determined in tetrahydronaphthalene at 135° C.

Efflamination of the I.R. absorption spectrum yielded the following composition values (mole-percent):

ethylene=86.2; 4-methylpentene-1=12.6; methyltetrahydroindene=1.2.

The raw copolymer was completely amorphous, on X-ray examination.

A sample of the raw copolymer, shaped by molding into a plate, was vulcanized with sulphur at 150° C. for 1.5 hours, using the following recipe:

| | Parts by wt. |
|---|---|
| Copolymer | 100 |
| Ultrasil VN$_2$ (silica) | 10 |
| Stearic acid | 1 |
| SWC [4,4-thio-bis(6-terbutylmetacresol)] | 0.5 |
| Sulphur | 1.5 |
| MBTS (benzothiazyl-disulphide) | 1.5 |
| TMT (tetramethylthiouram) | 0.2 |

Figure 1:
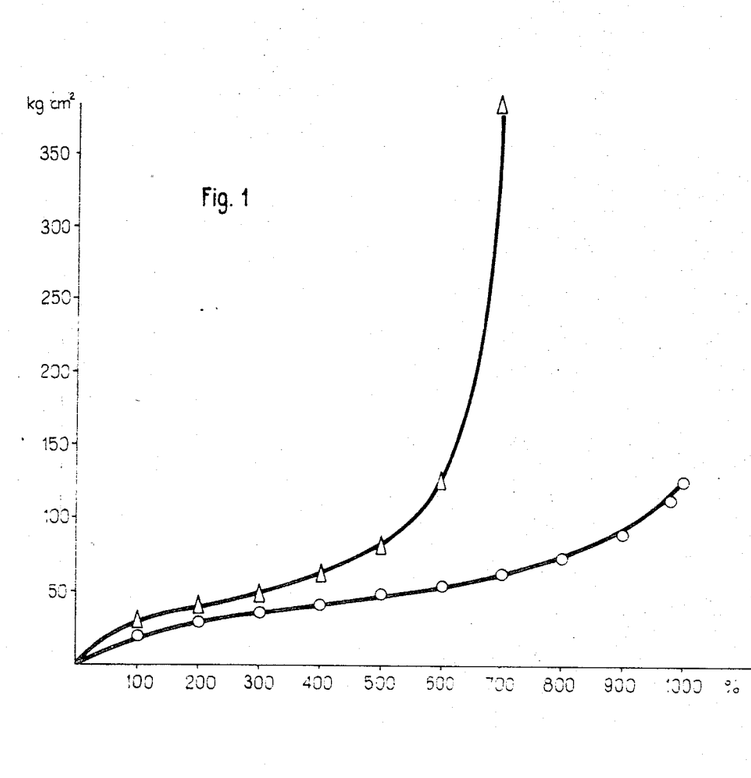

The molded and vulcanized plate, elongated 600% of its initial length, showed a crystallinity of the polyethylenic type when examined by X-ray. FIG. 1 of the drawings reports the tensile strength/elongation curves of the raw product and of the product vulcanized as described above. The points marked by circles represent the characteristics of the raw copolymer while the points marked with a triangle represent the characteristics of the vulcanized copolymer.

The figure reports on the abscissa the percentage elongation and on the ordinate the tensile strength. Such properties were determined according to ASTM test D 412–64 T (Die D).

Another sample of the crude terpolymer (30 g.) was transformed into fibers by dissolving it in 120 cc. of toluene, in a "Werner" mixer. The solution was let stand for 3 days in order to remove air bubbles and then was extruded in a dry-spinning apparatus (type of spinneret: 8/0.4 x 1 mm.; pressure 6 kg./cm.$^2$; winding up speed 4 m./min.).

The fibers were crosslinked by the treatment applied to the press-moulded plate and as described above. The fibers were found to have the following properties:

| | |
|---|---|
| Tenacity, g./den.[1] | 0.5 |
| Elongation in percent | 800 |
| Elastic recovery at 100% of elongation, percent | 94 |

[1] Den.=grams of a thread 9000 m. long.

The tenacity and elongation of the fibers were determined according to ASTM test D 2563/67 T; elastic recovery was determined according to the method of Susich and Backer, described in Textile Research J., 21, 482 (1951).

EXAMPLE 2

Into apparatus as described in Example 1, there were introduced under a nitrogen atmosphere: 150 cc. of anhydrous n-heptane, 0.4 g. of aluminum diethyl chloride, 80 cc. of 4-methylpentene-1 and 20 cc. of methyltetrahydroindene. The reaction mass was then cooled down to −20° C. and gaseous ethylene was introduced at a flow-rate of 60 l./hr. After 15 minutes, 5 cc. of a toluene solution containing 0.05 g. of vanadium acetylacetonate were introduced. The total polymerization time was 45 minutes, during which ethylene was introduced in 5-minute periods at a flow rate of 60 l./hr. alternated to periods of 5 minutes at a flow rate of 10 l./hr.

At the end of the polymerization the polymer was isolated as described in the preceding example; it amounted to 20 gr. and had an intrinsic viscosity $[\eta]=1.1$ dl./g. and the following molar composition:

ethylene=85.4%; 4-methylpentene-1=11.9%; methyltetrahydroindene=2.7%.

The raw copolymer was completely amorphous on X-ray examination. In contrast, the vulcanized (crosslinked) copolymer after being subjected to an elongation of 600%, showed a crystallinity of the polyethylenic type on the X-ray examination.

Figure 2:
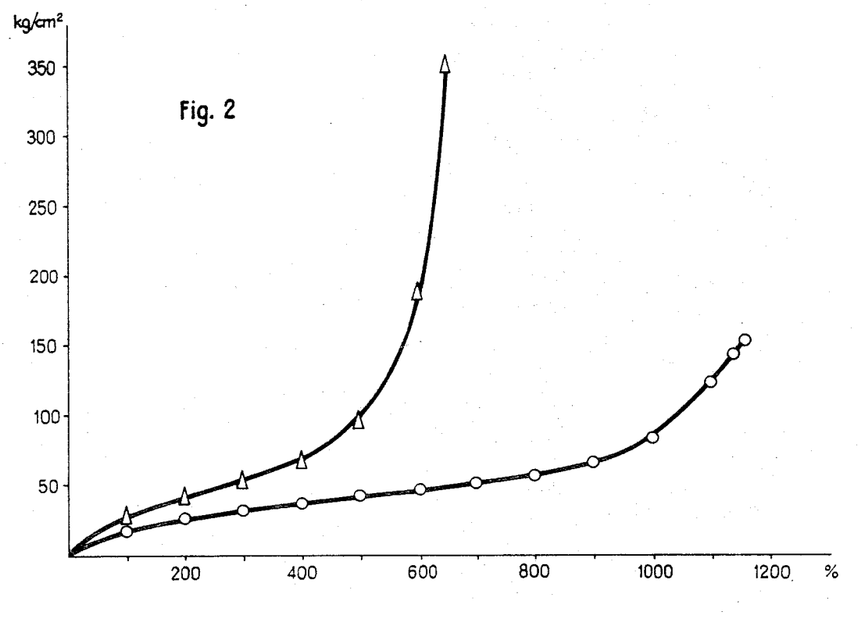

FIG. 2 reports the tensile strength/elongation curves of the raw copolymer and of the vulcanizate. The elastic recovery of the vulcanized copolymer at 100% of elongation was 94%. Such properties were determined according to ASTM test D 412–64 T (Die D).

EXAMPLE 3

Example 1 was repeated using, however, 200 cc. of anhydrous n-heptane, 200 cc. of 4-methylpentene-1 and 20 cc. of methyltetrahydroindene; furthermore the ethylene was introduced into the reactor at a constant flow-rate of 30 l./hr.

One hour after the introduction of vanadium acetylacetonate, the test was interrupted and the copolymer was separated in the usual way. It amounted to 30 g. and had an intrinsic viscosity $[\eta]=0.9$ dl./g. and the following composition (mole percent):

ethylene=81.0%; 4-methylpentene-1=17.4%; methyltetrahydroindene=1.6%.

The raw product was found to be completely amorphous on X-ray analysis, while the vulcanized product, subjected to an elongation of 600%, showed a crystallinity of the polyethylenic type.

Figure 3:
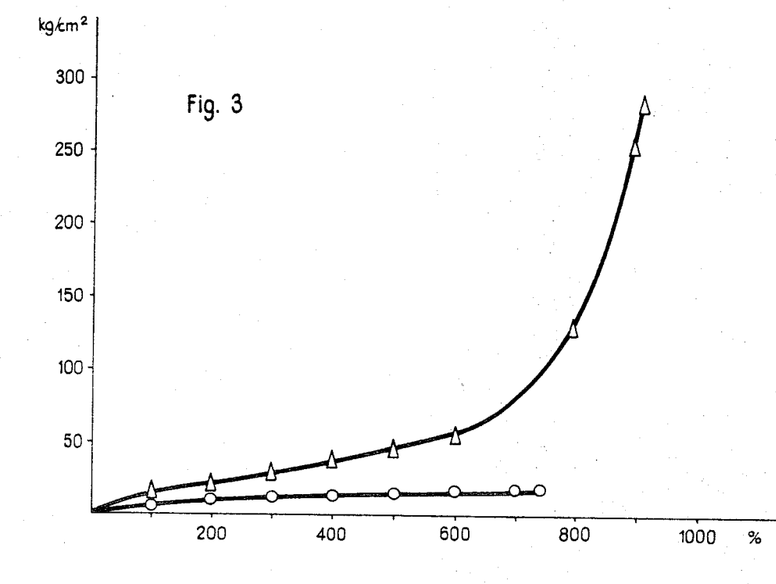

The tensile strength/elongation curves of the raw polymer and of the vulcanized product respectively, are reported in FIG. 3 of the drawing. The elastic recovery of the vulcanized polymer at 100% of elongation was 96%. Such properties were determined according to ASTM test D 412–64 T (Die D).

EXAMPLE 4

Into an apparatus as described in Example 1, having a holding capacity of 3 liters there were introduced under nitrogen atmosphere: 2000 cc. of anhydrous n-heptane, 1.2 g. of aluminumdiethyl chloride, 220 cc. of 4-methylpentene-1, and 70 cc. of methyltetrahydroindene.

The mixture was then cooled down to −20° C. and a gaseous mixture of ethylene and propylene was introduced at a flow rate of respectively 375 and 225 l./hr.

About 15 minutes later there were added 15 cc. of a toluene solution containing 0.15 g. of vanadium acetylacetonate. After 75 minutes the polymerization was interrupted and, operating as described previously, there were isolated 85 g. of copolymer having an intrinsic viscosity $[\eta]=1.8$ dl./g. and the following molar composition:

ethylene=78.6%; propylene=16.6%; 4-methylpentene-1=4.2%; methyltetrahydroindene=0.6%.

On X-ray examination, both the raw copolymer and the vulcanized product, examined in the relaxed state, proved to be completely amorphous; on the contrary, when subjected to an elongation of 550%, both exhibited a crystallinity of polyethylenic type.

Figure 4:
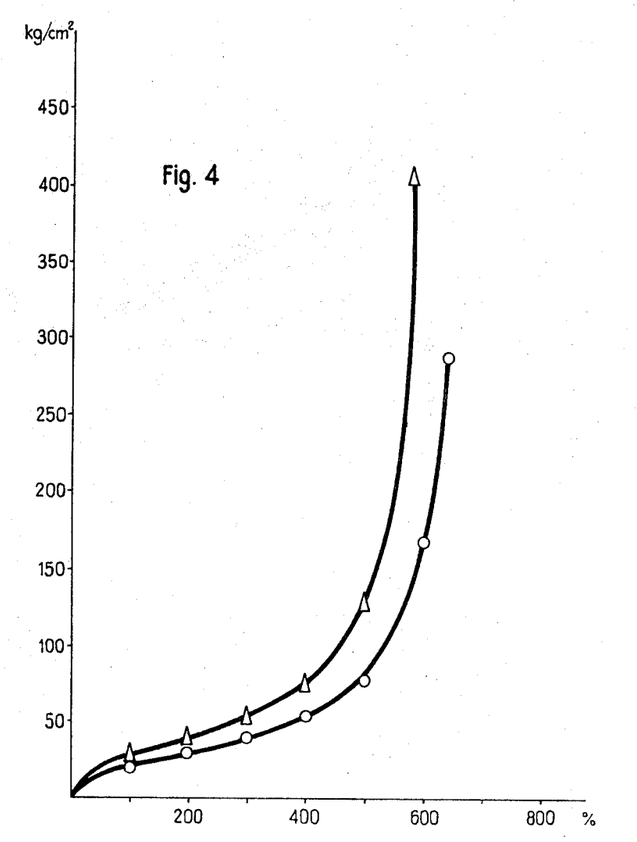

FIG. 4 of the drawing records the tensile strength/elongation curves of, respectively, the raw copolymer and of the same copolymer after vulcanization as described in Example 1. The elastic recovery of the vulcanized copolymer at 100% of elongation was 94%. Such properties were determined according to ASTM test D 412–64 T (Die D).

EXAMPLE 5

Example 4 was repeated but using 0.78 g. of aluminumdiethyl chloride, 120 g. of 4-methylpentene-1 and 60 cc. of methyltetrahydroindene and ethylene and propylene introduced at flow-rates of, respectively, 275 and 325 l./hr. Thereupon, there was added a toluene solution of vanadium triacetylacetonate (0.1 g. in 10 cc. of toluene) and, after one hour, the polymerization was interrupted, isolating by the usual treatment 52 g. of a copolymer having an intrinsic viscosity [η]=1.95 dl./g. and the following composition (moles percent):

ethylene=75.2%; propylene=20.8%; 4-methylpentene-1=2.8%; methyltetrahydroindene=1.2%.

The raw copolymer, on X-ray examination, was amorphous. The vulcanized copolymer product, subjected to an elongation of 650%, showed a crystallinity of the polyethylenic type.

Figure 5:
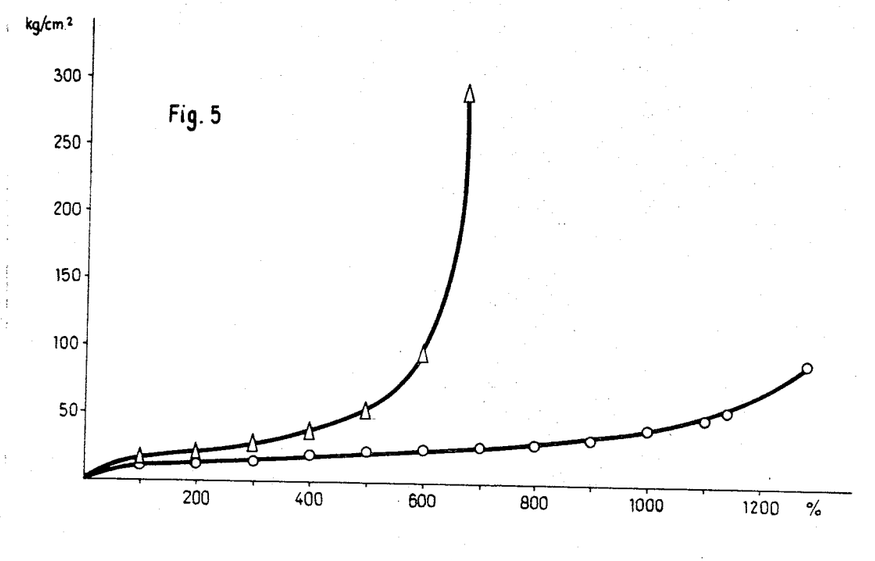

The tensile strength/elongation curves of, respectively, the raw copolymer and of the vulcanized product are recorded in FIG. 5 of the drawing. The elastic recovery of the vulcanized polymer at 100% of elongation was 98%. Such properties were determined according to ASTM test D 412–64 T (Die D).

EXAMPLE 6

Example 4 was repeated, but in this run there were used 30 cc. of 4-methylpentene-1 and 20 cc. of methyltetrahydroindene.

Ethylene and propylene were introduced at the respective flow-rates of 240 and 360 l./hr. The vanadium compound used in preparing the catalyst was, in this run, vanadium oxytrichloride (0.06 g.).

After 25 minutes of polymerization, there were obtained 16 g. of a polymer having an intrinsic viscosity [η] of 2.6 dl./g. and the following molar composition:

ethylene=79.2%; propylene=19.0%; 4-methylpentene-1=12%; methyltetrahydroindene=0.6%.

The raw copolymer, on X-ray examination, proved to be amorphous; the vulcanized product, subjected to an elongation of 700%, howed the presence of crystallinity bands.

Figure 6:
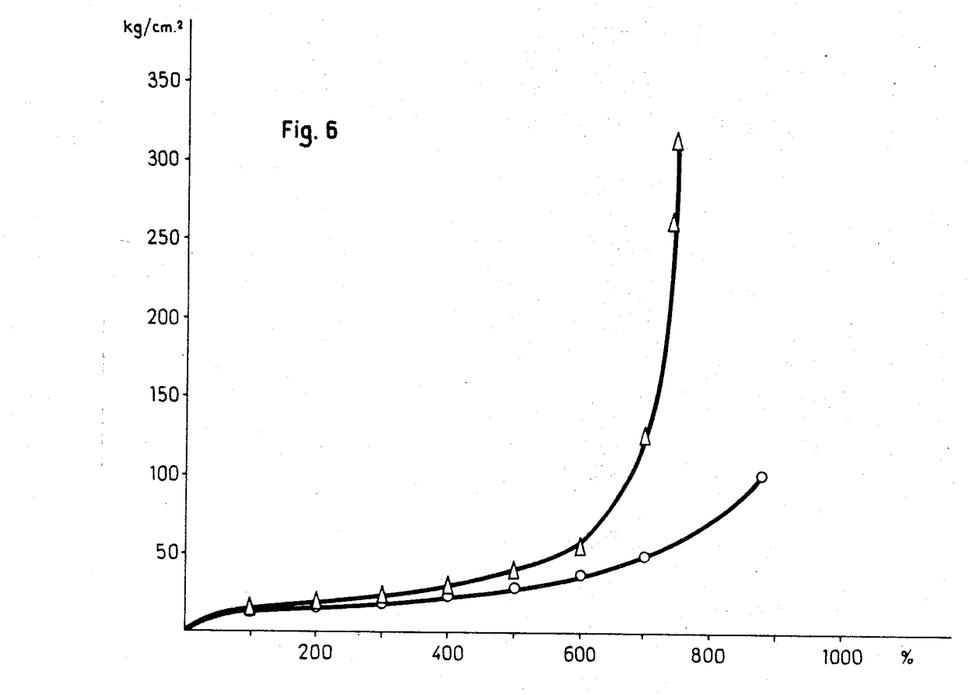

FIG. 6 of the drawing compares the tensile strength/elongation curves of the raw copolymer and of the vulcanized product respectively. The elastic recovery of the vulcanized polymer at 100% of elongation, was 99%. Such properties were determined according to ASTM test D 412–64 T (Die D).

EXAMPLE 7

Example 4 was repeated; however, in this run there were used 1000 cc. of anhydrous n-heptane, 0.78 g. of aluminumdiethyl chloride, 120 cc. of 4-methylpentene-1 and 40 cc. of methyltetrahydroindene. Furthermore, 10 cc. of a toluene solution containing 0.1 g. of vanadium acetylacetonate were added.

After 60 minutes, the polymerization was interrupted and, by operating as already described, there were isolated 50 g. of polymer having an intrinsic viscosity [η] of 1.6 dl./g. and the following molar composition:

ethylene=75.8%; propylene=18.4%; 4-methylpentene-1=4.4%; methyltetrahydroindene=1.4%.

On X-ray examination, both the raw copolymer and the vulcanized product, examined in the relaxed state, proved to be completely amorphous; in contrast, after being subjected to an elongation of 500%, both showed the presence of polyethylenic type crystallinity.

A sample of the raw copolymer, molded into a plate, was subjected to a vulcanization treatment with sulphur at 130° C. for 30 minutes, using the following recipe:

| | Parts by wt. |
|---|---|
| Copolymer | 100 |
| Ultrasil VN₂ (silica) | 10 |
| TiO₂ | 4 |
| MBT (mercapto-benzo-thiazol) | 0.5 |
| ZDC (zinc-diethyl-dithio-carbamate) | 1.5 |
| Sulphur | 1.5 |

Figure 7:
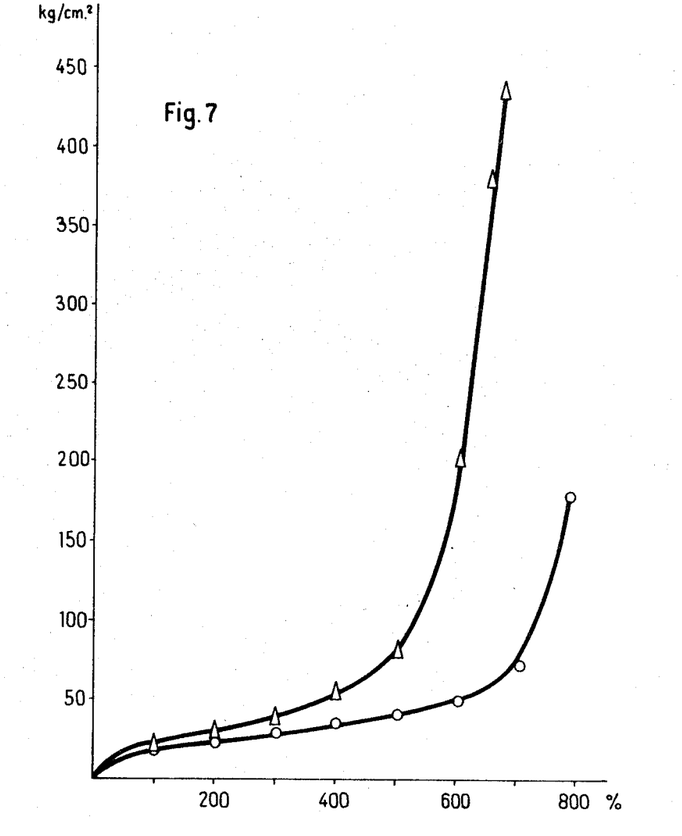

FIG. 7 of the accompanying drawing records the tensile strength/elongation curves of, respectively, the new copolymer and of the same vulcanized as described. The elastic recovery at 100% of elongation of the vulcanized product is 96%. Such properties were determined according to ASTM test D 412–64 T (Die D).

EXAMPLE 8

Into an apparatus like that described in Example 1 and having a holding capacity of 2 liters there were introduced in a nitrogen atmosphere, 1000 cc. of anhydrous n-heptane, 2.9 g. of aluminumdiethyl chloride, 100 cc. of 4-methylpentene-1 and 40 cc. of 5,7-dimethyloctadiene-1,6.

After cooling down to −20° C., gaseous ethylene and propylene were fed in at flow rates, respectively, of 560 and 340 liters/hour. After about 10 minutes 0.31 g. of vanadium triacetylacetonate dissolved in 30 cc. of anhydrous toluene were added.

After 50 minutes the polymerization was stopped and, by operating as described in Example 1, 23 g. of a solid copolymer were obtained. It had an intrinsic viscosity [η] of 1.16 dl./g. and the following molar composition:

ethylene=80.5%; propylene=16.6%; 4-methylpentene-1=6%; 5,7-dimethyloctadiene-1,6=1.3%.

On X-ray examination the copolymer was found to be completely amorphous. A sample of raw copolymer, molded into a plate, was vulcanized with sulphur at 130° C. for 30 minutes, using the following recipe:

| | Parts by weight |
|---|---|
| Vulcanized copolymer | 100 |
| Ultrasil VN₂ (silica) | 10 |
| MBT (mercapto-benzo-thiazol) | 0.5 |
| TiO₂ | 4 |
| SWC [4,4-thiobis(6-tert.butyl-metacreosol)] | 0.2 |
| ZDC (zinc-diethyl-dithiocarbamate) | 1.5 |
| Sulphur | 1.5 |

Figure 8:
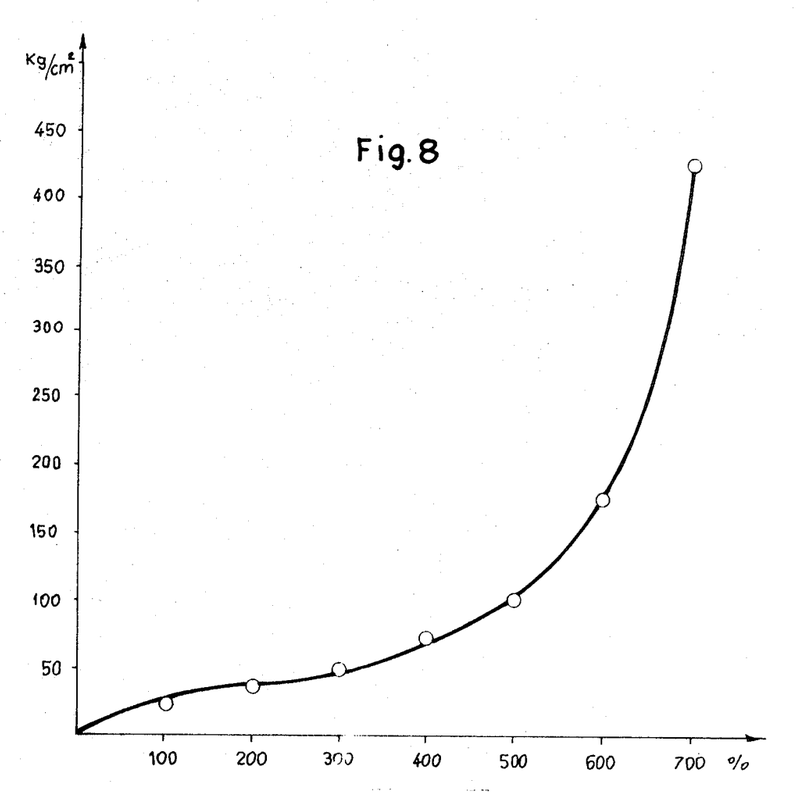

FIG. 8 of the accompanying drawing reports the tensile strength/elongation curve of the vulcanized copolymer. The elastic recovery at 100% of elongation of the vulcanized copolymer was equal to 90%.

Such properties were determinted according to ASTM test D 412–64 T (Die D). The molded and vulcanized plate, subjected to an elongation of 650% of its original length, showed, on the X-ray examination a crystallinity of the polyethylenic type.

EXAMPLE 9

Into an apparatus like that described in the preceding example, there were introduced 1000 cc. of anhydrous n-heptane, 3.2 g. of ethylaluminum sesquichloride, 100 cc. of 4-methylpentene-1 and 100 cc. of 4-vinylcyclohexene-1. This mass was then cooled down to −20° C. and into it was introduced a gaseous current of propylene and ethylene with the respective flow-rates of 340 and 560 l./hr.

After about 10 minutes, 0.21 g. of vanadium triacetylacetonate dissolved in 20 cc. of anhydrous toluene was added.

After another 10 minutes, the polymerization was interrupted and, by operating in the usual way, there were obtained 36 g. of a white polymer with an intrinsic viscosity (in tetrahydronaphthaline at 130° C.) [η]=1.5 dl./g., and having the following molar composition:

ethylene=75.2% propylene=18.7%; 4-methylpentene-1=5.7%; 4-vinylcyclohexene-1=0.4%.

On X-ray examination, the copolymer was seen as completely amorphous.

A sample of the raw copolymer was molded into a plate, using the following recipe:

| | Parts by wt. |
|---|---|
| Copolymer | 100 |
| SWC | 0.2 |
| Ultrasil VN₂ | 10 |
| TiO₂ | 4 |

Subsequently, the molded plate was vulcanized by exposing the plate to sulphur chloride vapors in a closed vessel for 3 hours, at reduced pressure and at room temperature.

Figure 9:
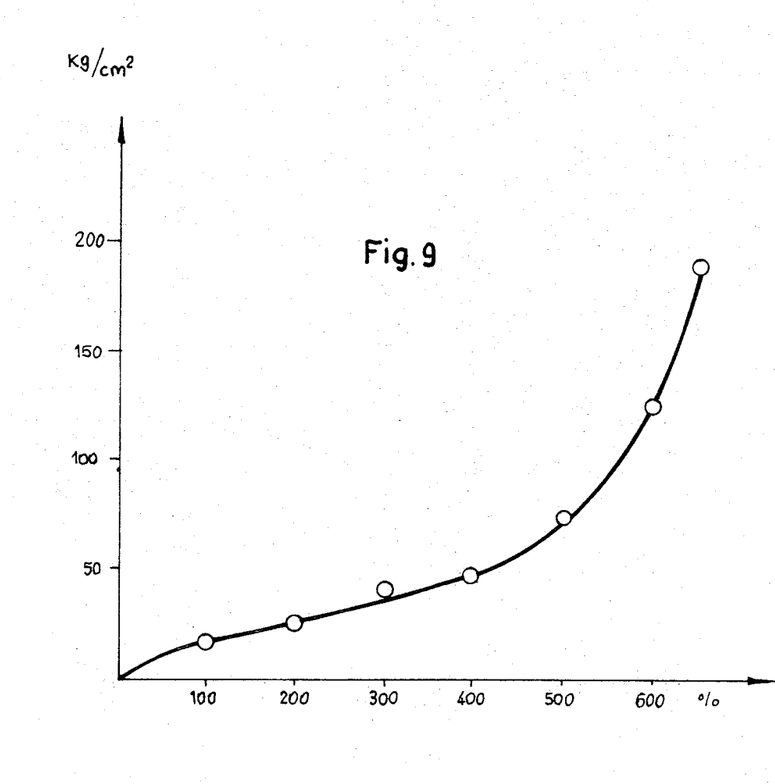

FIG. 9 records the tensile strength/elongation curve of the product vulcanized according to the above described procedure. The elastic recovery at 400% of elongation of the vulcanized product amounts to 98%. Such properties were determined according to ASTM test D 412-64 T (Die D). The molded plate, after vulcanization, and after being elongated by 600% of its initial length, showed, on X-ray examination, a weak crystallinity of the polyethylenic type.

EXAMPLE 10

Into an apparatus like that described in Example 1, but with a holding capacity of 3 liters, were introduced:

2 liters of n-heptane, 1.9 g. of aluminumdiethyl chloride, 200 cc. of 4-methylpentene-1 and 8 cc. of 5-ethylidenenorbornene-2.

This mixture was then cooled down to $-20°$ C. and a gaseous current of propylene and ethylene was introduced at flow-rates of, respectively, 170 and 430 l./hr.

After about 10 minutes there was introduced 0.31 g. of vanadium triacetylacetonate dissolved in 30 cc. of anhydrous toluene. During the polymerization, lasting 65 minutes, 16 cc. of ethylidenenorbornene were added in batches of 2 cc. each, 7 minutes (total ethylidenenorbornene used: 24 cc.).

At the end of the polymerization, after the purification carried out as described in the preceding examples, there were obtained 65 g. of copolymer having an intrinsic viscosity $[\eta]$ of 1.65 dl./g. (in tetrahydronaphthalene at 135° C.), and the following composition mole percent):

ethylene=80.8; propylene=15.4; 4-methylpentene-1=1.6; 5-ethylidenenorbornene-2=2.2.

On X-ray examination, the copolymer was seen as completely amorphous. A sample of the raw copolymer, molded into a plate, was subjected to vulcanization with sulphur at 130° C. for 30 minutes, using the recipe described in Example 8.

Figure 10:
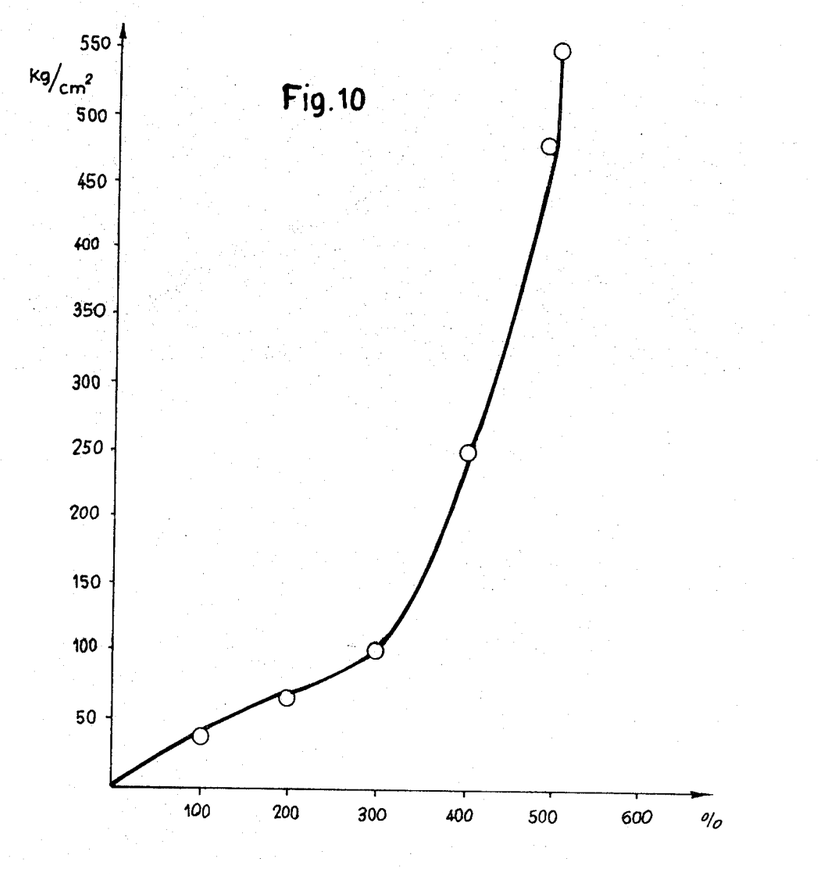

FIG. 10 records the tensile strength/elongation curve of the product vulcanized as described. The elastic recovery at 100% of elongation of the vulcanized product was 92%. Such properties were determined according to ASTM test D 412-64 T (Die D).

The molded and vulcanized plate, subjected to an elongation of 500% of its original length, showed, on X-ray examination, a crystallinity of the polyethylenic type.

EXAMPLE 11

Into apparatus as used in the preceding example, were introduced: 2 liters of n-heptane, 2.95 g. of aluminumdiethyl chloride, 240 cc. of 4-methylpentene-1 and 4 cc. of 5-ethylidenenorbornene-2. This mixture was then cooled down to $-20°$ C. and into it was introduced a gaseous current of propylene and ethylene at flow-rates for the two monomers of, respectively, 340 and 560 l./hr. After about 10 minutes, there was introduced 0.66 g. of vanadyl acetylacetonate dissolved in 40 cc. of anhydrous toluene.

During the polymerization, lasting 90 minutes, there were added a further 8 cc. of 5-ethylidenenorbornene-2 in batches of 1 cc. every 10 minutes (total ethylidenenorbornene used=12 cc.). At the end of the polymerization there were isolated 170 g. of solid copolymer having an intrinsic viscosity $[\eta]$ of 1.85 dl./g. (in tetrahydronaphthalene at 135° C.) and the following molar composition:

ethylene=79.8%; propylene=17.3%; 4-methylpentene-1=1.9%; 5-ethylidenenorbornene=1.0%.

On X-ray examination, the polymer proved to be completely amorphous. A sample of raw copolymer was molded into a plate and was then vulcanized with sulphur at 130° C. for 30 minutes, using the recipe described in Example 8.

Illustrations have been given of the preparation of specific terpolymers and tetrapolymers having the required compositions and properties, and of the transformation thereof into manufactured shaped articles prior to, or during, crosslinking of the polymer chains. It will be understood that some changes in details may be made in practicing the invention. Therefore, we intend to include in the scope of the appended claims, all such modifications and variations as will be obvious to those skilled in the art from the description and working examples given herein.

Figure 11:
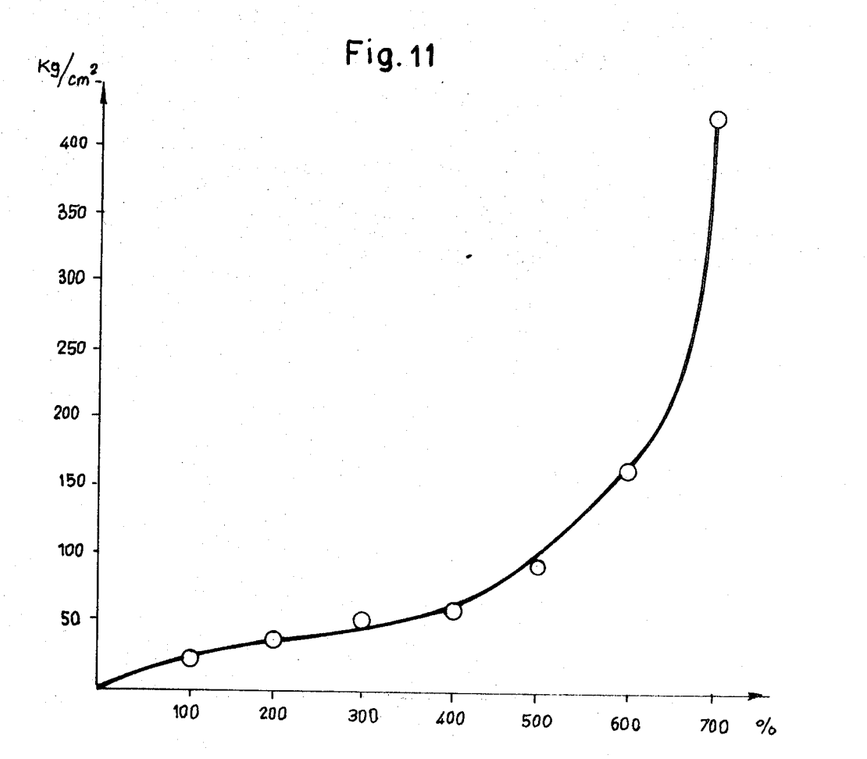

FIG. 11 of the drawing shows the tensile strength/elongation curve of the copolymer vulcanized as specified. The elastic recovery at 100% of elongation of the vulcanized copolymer was 94%. Such properties were determined according to ASTM test D 412-64 A (Die D).

The molded and vulcanized plate, subjected to an elongation of 650% of its original length, showed, on the X-ray analysis, a crystallinity of the polyethylenic type.

EXAMPLE 12

An amorphous copolymer obtained as described in Example 1 was transformed into a thin film during vulcanization thereof using the recipe used to crosslink the press-molded plate.

The resulting film of the vulcanized copolymer was insoluble in all solvents, even at the boiling point. When the film was stretched to 400% of its initial length and subjected to X-ray examination it was found to be crystalline.

We claim:

1. Manufactured elastic articles obtained from a normally amorphous, unsaturated, elastomeric and crosslinkable high molecular weight copolymer prepared by copolymerizing a mass consisting of a mixture of ethylene, a branched alpha-olefin, at least one polyene containing at least two double bonds and, optionally, propylene, in contact with a catalyst prepared by mixing a hydrocarbon-soluble vanadium compound with an organometallic aluminum compound, said copolymer having an overall content of polymerized ethylene of from 70 to 90% by mols, an overall content of polymerized branched alpha-olefin of from 1 to 29% by mols, an overall content of polymerized polyene of from 0.05 to 3.0% by mols and, optionally a polymerized propylene content of up to 28% by mols, said elastic articles being obtained by shaping the normally amorphous copolymer to the desired shape prior to or during crosslinking thereof, and thereafter stretching the article to at least 100% of its initial length to convert it to an elastic article which exhibits crystallinity in the stretched condition.

2. Elastic fibers obtained according to claim 1.

3. Elastic films obtained according to claim 1.

4. Manufactured elastic articles obtained according to claim 1 further characterized in that the hydrocarbon monomer containing at least two double bonds is selected from the group consisting of dienes and non-conjugated aliphatic polyenes, alkenylcycloalkenes, non-conjugated monocyclic dienes, endomethylenic polycyclic polyenes, polycyclic polyenes having condensed rings in which each pair of condensed rings has two carbon atoms in common, and di- or poly-alkenylcycloalkanes.

5. Elastic fibers obtained according to claim 1.

6. Elastic films obtained according to claim 1.

7. Manufactured elastic articles obtained according to claim 1, further characterized in that the hydrocarbon monomer containing at least two double bonds and units of which are present in macromolecules of the cross-linkable copolymer is selected from the group consisting of dienes and non-conjugated aliphatic polyenes, alkenylcycloalkenes, non-conjugated monocyclic dienes, endomethylenic polycyclic polyenes, polycyclic polyenes having condensed rings in which each pair of condensed rings has two carbon atoms in common, and di- or poly-alkenylcycloalkanes.

8. Manufactured elastic articles according to claim 1, further characterized in that the mass comprising the normally amorphous copolymer is shaped simultaneously with crosslinking of the copolymer.

References Cited

UNITED STATES PATENTS

| | | | |
|---|---|---|---|
| 3,063,973 | 11/1962 | Gladding et al. | 260—79.5 |
| 3,079,370 | 2/1963 | Precopio et al. | 260—94.9 |
| 3,378,606 | 4/1968 | Kontos | 260—878 |

JOSEPH L. SCHOFER, Primary Examiner

R. A. GAITHER, Assistant Examiner

U.S. Cl. X.R.

260—88.2 E

UNITED STATES PATENT OFFICE
CERTIFICATE OF CORRECTION

Patent No. 3,660,364     Dated May 2, 1972

Inventor(s) Paolo Longi, et. al.

It is certified that error appears in the above-identified patent and that said Letters Patent are hereby corrected as shown below:

Column 1, in the heading, insert "Foreign Application Priority Data  April 4, 1968   Italy   14,809 A/68 -- .

Signed and sealed this 27th day of March 1973.

(SEAL)
Attest:

EDWARD M. FLETCHER, JR.          ROBERT GOTTSCHALK
Attesting Officer                Commissioner of Patents